C. E. ALLEN.
PLOW SHOVEL.
APPLICATION FILED OCT. 16, 1909.
966,411.
Patented Aug. 9, 1910.
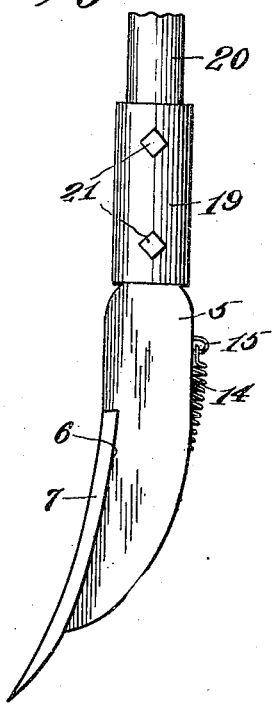
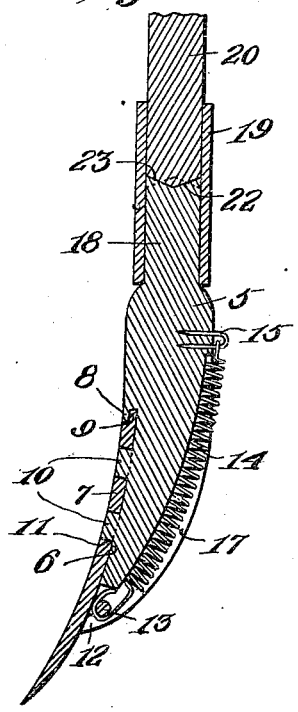
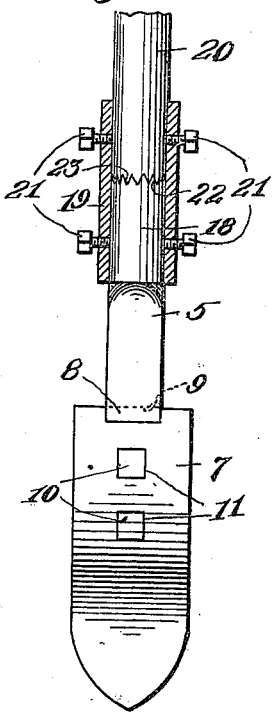
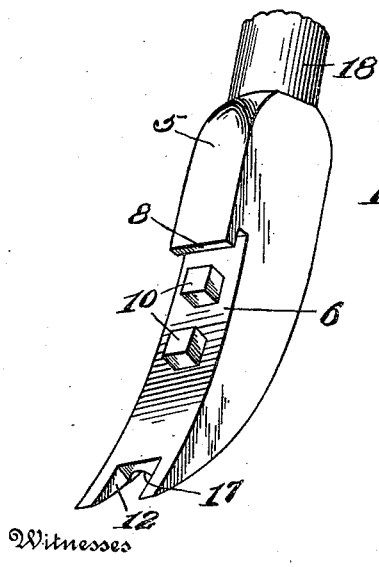
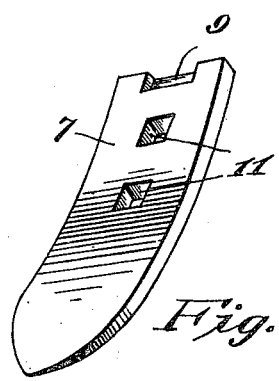
Witnesses
James F. Crowi
E. M. Ricketts
Inventor
C. E. Allen
By Watson E. Coleman
Attorney
THE NORRIS PETERS CO., WASHINGTON, D. C.

UNITED STATES PATENT OFFICE.

CHARLES E. ALLEN, OF KONAWA, OKLAHOMA, ASSIGNOR OF ONE-HALF TO THOMAS R. DUNCAN, OF KONAWA, OKLAHOMA.

PLOW-SHOVEL.

966,411.  Specification of Letters Patent.  Patented Aug. 9, 1910.

Application filed October 16, 1909. Serial No. 522,996.

*To all whom it may concern:*

Be it known that I, CHARLES E. ALLEN, a citizen of the United States, residing at Konawa, in the county of Seminole and State of Oklahoma, have invented certain new and useful Improvements in Plow-Shovels, of which the following is a specification, reference being had to the accompanying drawings.

This invention relates to certain new and useful improvements in plows and more particularly to a plow or shovel such as employed in the construction of cultivators, and like earth working machines.

The primary object of the invention is to provide a shovel which may be secured upon the plow foot in such a manner as to entirely eliminate the use of bolts or nuts.

A further object is to provide a device of this character which is of simple construction whereby the shovel may be very quickly attached to or detached from the plow foot, without requiring the employment of skilled labor.

A further object is to provide new and novel means whereby the shovel and foot may be angularly positioned with relation to the direction of movement of the machine, to throw the earth toward or away from the drill.

With these and other objects in view, the invention consists of the novel construction, combination and arrangement of parts hereinafter fully described and claimed, and illustrated in the accompanying drawing, in which—

Figure 1 is a side elevation of a cultivator shovel embodying my improvements; Fig. 2 is a longitudinal section thereof; Fig. 3 is a top plan view partly in section; Fig. 4 is a detail perspective view of the plow foot; Fig. 5 is a similar view of the shovel.

Referring to the drawings 5 indicates the plow foot, which is of rectangular cross sectional form and has its upper edge cut away as at 6 to provide a seat for the shovel 7. The cut-away portion 6 extends from the lower end of the foot to a point adjacent to the upper end thereof, where the foot is formed with a lip 8 which projects over said cut-away portion and is received in a transverse recess 9 provided in the upper end of the shovel 7. It will be noted from reference to Fig. 2 that the shovel is thus arranged flush with the upper edge of the foot, and as an additional means of security therefor the foot is provided with the lugs 10 which extend transversely and are received in the openings 11 in the shovel. These studs or openings are preferably rectangular, though it will be noted that they may have any other desired form. The studs are likewise flush with the outer surface of the shovel. It will be noted that the shovel 7 is curved longitudinally throughout its length. The rear edge of the foot 5 is also curved as it approaches the lower end of the shovel. At its extremity the foot is recessed as shown at 12 to receive a lug 13 integrally formed upon the under face of the shovel 7. To this lug one end of the coiled spring 14 is secured, the other end thereof being secured by means of a staple 15 to the rear edge of the foot at its upper end. This spring is positioned in a comparatively deep longitudinal groove 17 which is formed in the foot 5. Under all normal conditions during the working of the machine, there is no tension whatever exerted on the shovel 7 by this spring, while at the same time the spring efficiently acts to prevent the displacement of the shovel from the foot in case an obstruction should be encountered.

The upper end of the foot 5 is formed with a reduced shank portion 18. This shank is loosely positioned in the lower end of a cylindrical sleeve 19, the other portion of this sleeve receiving a carrying rod 20. Set screws 21 arranged diametrically opposite to each other and positioned through said sleeve are adapted to have binding engagement upon the periphery of the shank and carrying rod to rigidly secure the same within the sleeve to prevent any rotative movement thereof. The opposed ends of the shank and carrying rod are formed with the serrations 22 and 23, respectively, which are radially arranged thereon. The serrated ends of the shank and rod are adapted to be engaged to prevent independent rotary movement of these members within the sleeve.

When it is desired to adjust the shovel 7, to cut a deep furrow, the upper set screws 21 are loosened and the sleeve moved downwardly upon the carrying rod, the ends of the rods 18 and 20 being thus separated, and the set screws tightened to secure the foot in its extended position on the carrying rod. When it is desired to adjust the shovel so as to direct the earth toward or away from the drill, the lower set screws 21 are loosened and the foot shank turned within the sleeve until the shovel is disposed at the required angle with relation to the direction of travel of the machine. The serrated ends of the shank and carrying rod are locked as above described and the set screws adjusted to secure the shovel in position.

From the above it will be seen that a wide range of angular adjustment of the shovel may be obtained, whereby the cultivation of various products may be more efficiently performed than with devices of this character as heretofore constructed.

It will be noted that the use of bolts, rivets, or analogous fastening devices whereby the shovel is secured to the foot, has been entirely eliminated and in lieu thereof means are provided for securely holding the shovel in working position, while at the same time it may be instantly removed from or placed upon the foot.

It will be understood that the plow foot may be of many different forms and the shovel also may have any desired shape or proportions.

Many other minor modifications may be resorted to without materially departing from the essential features or sacrificing any of the advantages of the invention.

The device constructed as above set forth comprises very few elements which may be inexpensively produced and assembled in position. It is also very durable and highly efficient in use.

Having thus described the invention, what is claimed is:

1. A plow comprising a foot, a shovel removably disposed upon the upper edge of said foot, said foot having a lateral recess therein forming an overhanging lip, said shovel having a recess in its upper end to receive said lip, means integrally formed with the foot engaging with the shovel to prevent its lateral movement, and a spring seated in a longitudinal groove formed in the under side of said foot and connected to said shovel to yieldingly hold the same in position.

2. A plow comprising a foot having its upper edge longitudinally cut away to provide a seat, a shovel disposed on said seat, said shovel having a transverse recess in its upper end, said foot having a lip extending over said cut-away portion adapted to be received in said recess, and means for yieldingly holding said shovel in position.

3. A plow comprising a foot having lugs integrally formed upon its upper edge, a shovel adapted to be seated on said foot, said shovel having openings therein to receive said lugs, a lip on said foot adapted to engage the upper edge of said shovel, and a coiled spring secured to the rear of said shovel adjacent to its lower end and to said foot to yieldingly hold the shovel in position.

4. A plow comprising a foot, said foot having rectangular lugs on its upper edge, a shovel seated on said foot and having openings therein to receive said lugs, a lip formed on said foot, said lip being disposed in a transverse recess in the upper end of said shovel when the shovel is in position, said foot having a longitudinal groove in its lower edge, and a coiled spring having one of its ends secured to said shovel, said spring being disposed in said groove and having its other end secured to the foot.

5. A plow comprising a foot, a shovel removably seated on the upper edge of said foot, means secured to said shovel and disposed in a groove in the lower edge of said foot to yieldingly hold said foot in position, a cylindrical shank on the upper end of said foot, a sleeve adapted to receive said shank, a carrying rod disposed in said sleeve, the opposed ends of said shank and rod being serrated for locking engagement with each other, said shank and rod being longitudinally movable in the sleeve to position the shovel, said foot and shovel being laterally adjustable in the sleeve, and means carried by said sleeve for rigidly securing the foot and carrying rod therein.

In testimony whereof I hereunto affix my signature in the presence of two witnesses.

CHARLES E. ALLEN.

Witnesses:
W. W. PRYOR,
JNO. L. WOODING.